United States Patent
Hsu

(10) Patent No.: US 9,622,422 B2
(45) Date of Patent: Apr. 18, 2017

(54) PRUNING SHEARS WITH MULTI-STAGE ACTION

(71) Applicant: FORMOSA TOOLS CO., LTD., Changhua (TW)

(72) Inventor: Wei-Chun Hsu, Changhua (TW)

(73) Assignee: Formosa Tools CO., Ltd., Changhua (TW)

(*) Notice: Subject to any disclaimer, the term of this patent is extended or adjusted under 35 U.S.C. 154(b) by 10 days.

(21) Appl. No.: 14/724,823

(22) Filed: May 29, 2015

(65) Prior Publication Data
US 2016/0345505 A1 Dec. 1, 2016

(51) Int. Cl.
*B26B 13/26* (2006.01)
*A01G 3/02* (2006.01)

(52) U.S. Cl.
CPC .............. *A01G 3/021* (2013.01); *B26B 13/26* (2013.01)

(58) Field of Classification Search
CPC ................................ A01G 3/021; B26B 13/26
USPC ........................................................... 30/251
See application file for complete search history.

(56) References Cited

U.S. PATENT DOCUMENTS

| | | | | |
|---|---|---|---|---|
| 3,210,844 A * | 10/1965 | Tontscheff | ........... | B23D 29/023 30/192 |
| 3,243,880 A * | 4/1966 | Weller | ..................... | A01G 3/02 30/189 |
| 4,312,127 A * | 1/1982 | Tanaka | ................... | B23D 21/10 30/250 |
| 5,718,051 A * | 2/1998 | Huang | ................... | B23D 21/10 30/250 |
| 6,098,291 A * | 8/2000 | Wang | ..................... | B23D 21/06 30/190 |
| 6,766,581 B2 * | 7/2004 | Nordlin | ................ | B23D 29/023 30/251 |
| 7,127,819 B1 * | 10/2006 | Huang | ................... | B23D 21/06 30/251 |
| 2016/0113208 A1 * | 4/2016 | Hsu | ........................ | B26B 13/26 30/251 |
| 2016/0120132 A1 * | 5/2016 | Hsu | ........................ | A01G 3/021 30/251 |

* cited by examiner

*Primary Examiner* — Hwei C Payer
(74) *Attorney, Agent, or Firm* — Raymond Y. Chan; David and Raymond Patent Firm

(57) ABSTRACT

A pair of pruning shears with multi-stage actions for cutting branches with larger diameters is revealed. The pruning shears include a fixing member, a blunt member, a cutting tool, a crank member, a moveable handle, a first locking member, and a second locking member. The fixing member, the crank member and the cutting tool are pivotally connected. The cutting tool consists of a blade part and a curved teeth part. The first locking member and the second locking member are pivotally connected to the fixing member and the crank member respectively. Each locking member is disposed with a hook part, a first projecting rod, and a second projecting rod. The first projecting rod and the second projecting rod are arranged symmetrically. The first locking member and the second locking member are engaged with different teeth respectively at different stages. Thereby the pruning shears performs cutting at different stages.

3 Claims, 11 Drawing Sheets

PRUNING SHEARS WITH MULTI-STAGE ACTION

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a pair of pruning shears with multi-stage actions for cutting branches with larger diameters, especially to a pair of pruning shears with multi-stage actions for cutting branches whose diameter is larger than 30 mm. By multi-stage actions, the force required for cutting the branch is given at different stages.

Description of Related Arts

Generally pruning shears are used for cutting and trimming branches of trees and flowers to improve the environment and accelerate growth of flowers and plants. Most of plants around the house are small shrubs. In order to improve air quality and living environment, many people starts to plant large trees and flowers, even large fruit trees. The branches and leaves of trees/flowers are grown and scattered. Thus proper pruning is required. Moreover, when a typhoon hits or bad weather comes, the branches may be broken and crashed to cause damage to nearby homes and people. Thus tree trimming and pruning is required at times for growing and beauty of the trees and for the safety. The diameter of most branches of the large trees is larger than 30 mm. It's difficult to cut the branch once by general pruning shears.

Refer to Taiwanese Pat. TW M356376, a pair of pruning shears with multi-stage action is revealed. The pruning shears include a fixing base, two moveable seats, a cutting blade, a blade spring, a stopping hooked rod, two support pieces, two support springs and two protection covers. The fixing base is formed by two corresponding bases. A blunt part is disposed on an upper part of the fixing base while a first pivoting hole is arranged at a front surface and a second pivoting hole is mounted at a rear surface of a middle part of the fixing base. The first pivoting hole is used together with a first pivoting rod and the second pivoting hole is used in combination with a second pivoting rod. A long insertion hole is set at a center of the fixing base. A lower part of the fixing base is disposed with a fixing part, a connecting hole and a connecting handle extended thereof. The fixing part is used together with a fixing pin while the connecting hole is used with a connecting rod. An upper part of the moveable seat is arranged with a second pivoting hole, a curved adjustment hole in front of the second pivoting hole, and a connecting handle extended from a lower part thereof. A blade corresponding to the blunt part of the fixing base is disposed on an upper part of the cutting blade. A first pivoting hole and a first fixing part are arranged at a middle part of the cutting blade while a plurality of one-direction locking teeth is set on a lower part of the cutting blade. The locking teeth are arranged in a curved manner. The stopping hooked rod includes a second fixing part set in front of a lower part thereof, a connecting hole on a center thereof, a leaning part disposed on a rear side and close to an upper part thereof, and a fastening hook arranged at the upper part hereof. A third fixing part is disposed on an edge at the top side of the support piece while a fastening hole corresponding to a fixing rod is mounted on a bottom side thereof. A housing chamber with the same shape of the insertion hole of the fixing base is projecting from the protection cover. A fourth fixing part is disposed in one side of an upper part of the housing chamber while an assembly hole corresponding to the first pivoting hole and the connecting hole of the fixing base is arranged outside the fixing chamber.

The above pruning shears are used for gardening and acted at multiple stages. The moveable seats are used in combination with the fixing rod to drive the cutting blade so that a part of the locking teeth is moved for cutting. When the cutting blade and the fixing rod are turned back for next stage of cutting, they are fixed by fastening hook of the stopping hooked rod. Thus the cutting blade will not be opened. Then the moveable seats and the fixing rod drive the locking teeth to move at the next stage. The cutting is finished at multiple stages by repeating the above process and the force applied is maintained at the same level. The cutting is easily completed by the force applied to the same cutting site at several times.

However, during the movement of the cutting blade being driven to open, the cutting blade is always opened over a certain angle. In other words, the first stage action is for opening the cutting blade completely so that a driving handle should be opened to the maximum angle and the maximum distance between the blade and the blunt part is achieved. While performing the second stage, the third stage and the fourth stage of cutting, the blade is gradually opened. Thus the angle between the blade and the blunt part being driven to be opened at the second stage and the third stage should be no more than the angle opened at the first stage. Otherwise, the pruning shears become back to the completely opened mode between the blade and the blunt part at the first stage. Moreover, the movement of the blade at each stage is too long so that users waste much force during multiple stages of movement.

SUMMARY OF THE PRESENT INVENTION

Therefore it is a primary object of the present invention to provide a pair of pruning shears with multi-stage actions for cutting branches with larger diameters including a fixing member, a blunt member, a cutting tool, a crank member, a moveable handle, a first locking member, a second locking member, a first spring, a second spring and a third spring. The fixing member is formed by a first fixing part and a second fixing part assembled with each other correspondingly. The first fixing part is disposed with a first axial hole, a first slide slot, a first shaft hole, and at least one mounting hole while the second fixing part is arranged with a second axial hole, a second slide slot, a second shaft hole, and at least one mounting hole. The holes are corresponding to each other and having the same shape.

The blunt member is clipped and fixed between the first fixing part and the second fixing part.

The crank member is composed of a first crank part and a second crank part, both are curved plates with corresponding shapes. Each crank part consists of a front plate and a rear plate formed by extension and bending of the front plate. One front plate is disposed with a third axial hole, a third slide slot, and a first sub hole while the other front plate is having a fourth axial hole, a fourth slide slot, and a second sub hole. One rear plate is arranged with a first main hole, a first insertion hole and a third sub hole while the other rear plate is mounted with a second main hole, a second insertion hole and a fourth sub hole.

The cutting tool is composed of a blade part, a lower part, a curved teeth part and a locking hole. A lower end at the rear side of the blade part is extended to form the curved teeth part. The teeth part 32 is extended to the lower part. The lower part is set with a fifth axial hole and the locking hole.

Each locking member (the first and the second locking members) is disposed with a hook part, a first projecting rod, and a second projecting rod. The first projecting rod and the second projecting rod are arranged symmetrically. The first locking member is further arranged with a first pivot hole and a hole while the second locking member is with a second pivot hole. The first locking member is pivotally connected to the fixing member while the second locking member is pivotally connected to the crank member.

The fifth axial hole of the cutting tool is aligned with the third, the fourth axial holes of the crank member and the first, the second axial holes of the fixing member for being connected to one another pivotally and coaxially.

The moveable handle includes a handle part while one end of the handle part is arranged with a fifth slide slot and a sixth axial hole. The first and the second main holes of the crank member are aligned with and connected to the second pivot hole of the second locking member pivotally and coaxially and so are the sixth axial hole of the moveable handle, the first assembly hole and the second assembly hole of the fixing member.

The first spring consists of a coil part extended to form a spring part and a rear end formed by extension and bending of the spring part. The rear end is hooked into the hole of the first locking member while the coil part is pivotally connected to the fixing member. Thus the first locking member can be turned back elastically.

The second spring is a return spring having two coil parts and an against part. The coil parts are coiled and extended to form the against part inclined at an angle. The coil parts are pivotally disposed in the crank member. The against part is leaning against the second locking member so that the second locking member can be turned back elastically.

The third spring includes a coil part extended to form a spring part and a hooked tail end formed by extension and bending of the extended to form a spring part. The tail end is hooked into the locking hole of the cutting tool while the coil part is pivotally connected to the fixing member. Thus the cutting tool is maintained at the pulled state when the cutting tool is driven to be closed gradually. Moreover, the first and the second insertion holes of the crank member are pivotally connected to the fifth slide slot.

When the pruning shears are opened and closed for cutting, the first locking member and the second locking member are engaged with two teeth of the curved teeth part respectively at the same time. Thereby closing action of the cutting tool is divided into four stages each of which the first locking member and the second locking member are engaged with different teeth respectively so as to restrict the moved distance of the cutting tool at each stage. Being driven by opening and closing of the handle part, the first locking member and the second locking member are released from the original tooth engaged and moved to the next tooth respectively at each of the four stages. The distance between the blade part and the blunt member is gradually shortened at each of the four stages. At the fourth stage. The blade part and the blunt member are completely closed to each other.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Please refer to following embodiments for details of structure and technical features of the present invention.

Figure 1:
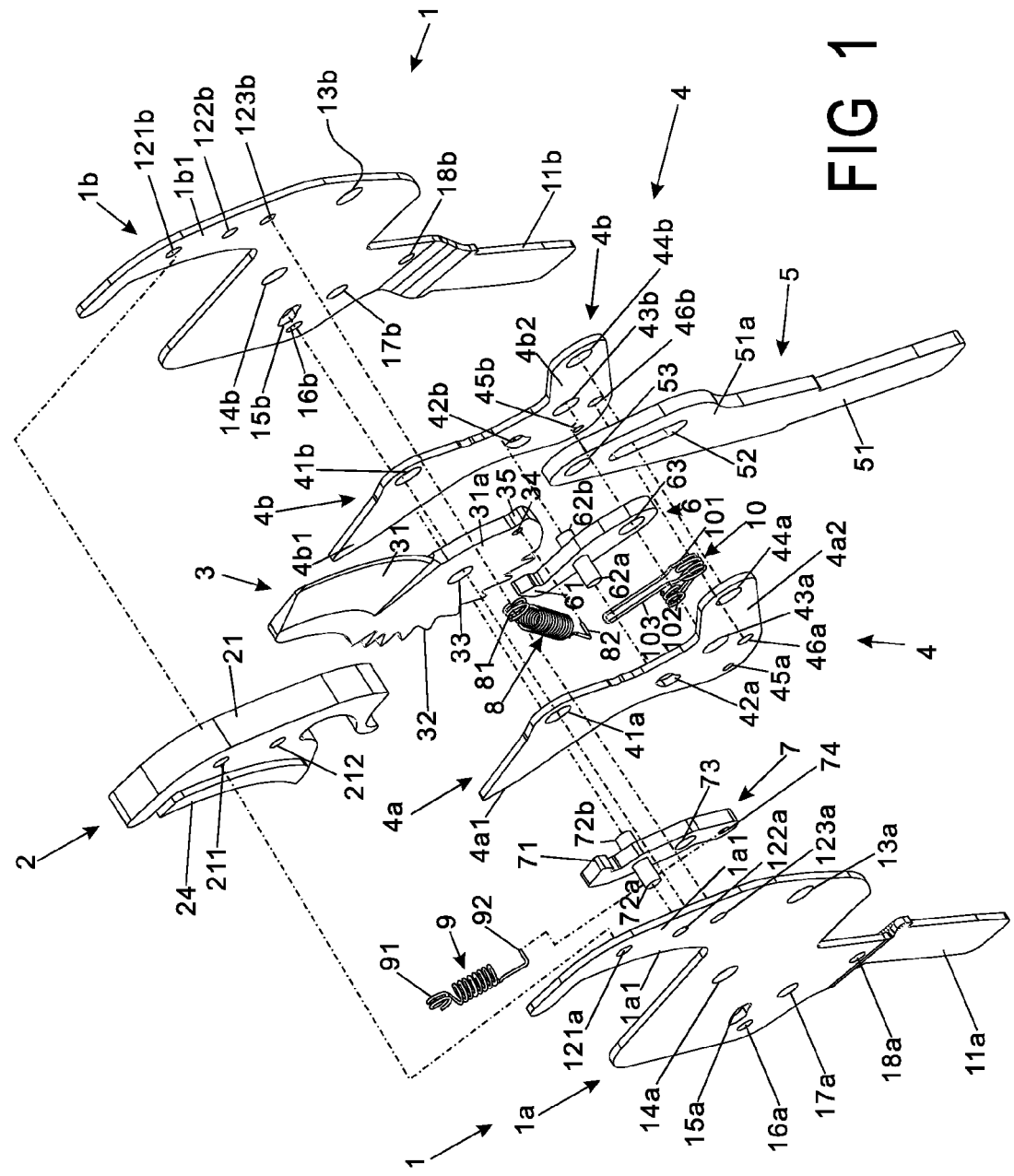
FIG. 1 is a partial explosive view of an embodiment according to the present invention.
Figure 2:
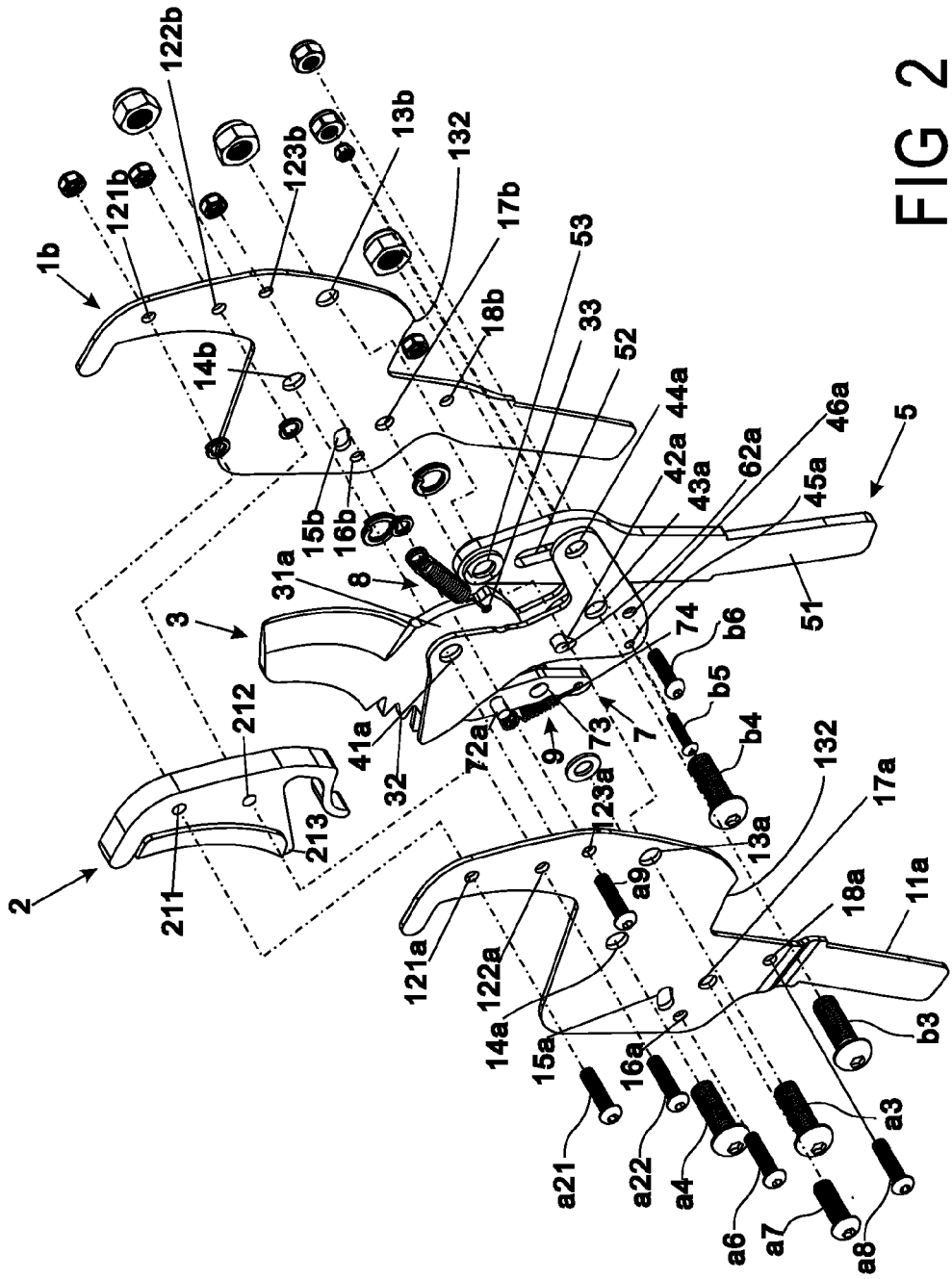
FIG. 2 is an explosive view of an embodiment according to the present invention.
Figure 3:
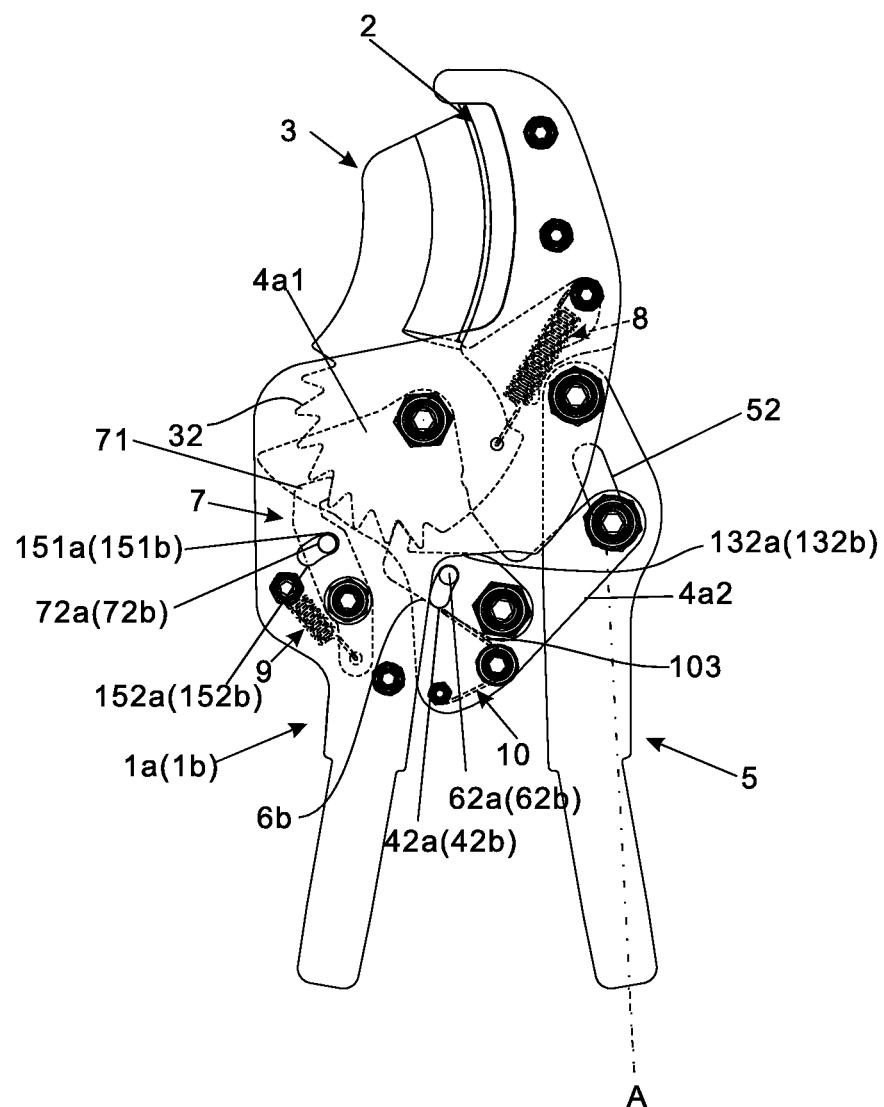
FIG. 3 is a schematic drawing showing an embodiment at a completely closed state according to the present invention.

The present invention provides pruning shears for trimming branches of trees having diameter of at least 30 mm. Refer to FIG. 1, FIG. 2 and FIG. 3, the pruning shears includes a fixing member 1, a blunt member 2, a cutting tool 3, a crank member 4, a moveable handle 5, a first locking member 7, a second locking member 6, a first spring 9, a second spring 10 and a third spring 8. The fixing member 1 consists of a first fixing part 1a and a second fixing part 1b corresponding to and assembled with each other. The first fixing part 1a is composed of an upper portion 1a1, a handle portion 11a formed by extension of the upper portion 1a1, and a step-like portion 132 between the upper portion 1a1 and the handle portion 11a. The upper portion 1a1 is disposed with a first axial hole 14a, a first slide slot 15a, a first assembly hole 13a, a first shaft hole 17a, mounting holes 16a, 18a, and mounting holes 121a, 122a, 123a while the other upper portion 1b1 is arranged with a second axial hole 14b, a second slide slot 15b, a second assembly hole 13b, a second shaft hole 17b, mounting holes 16b, 18b, and mounting holes 121b, 122b, 123b. The mounting hole 18a of the first fixing part 1a is aligned with the mounting hole 18b of the second fixing part 1b to be fastened by a screw a8.

The blunt member 2 consists of a back part 21 and a leaning part 24. One end of the leaning part 24 is extended to form the lip part 213 while the opposite end of the leaning part 24 is extended to form the back part 21. The back part 21 is arranged with fastening holes 211, 212. After the fastening holes 211, 212 being aligned with the mounting holes 121a, 122a of the first fixing part 1a and the mounting holes 121a, 122a of the second fixing part 1b, screws a21, a22 are passed therethrough to be fastened on the fixing member 1 by nuts so as to position the blunt member 2 on the upper part 1a1 (1b1).

The crank member 4 is composed of a first crank part 4a and a second crank part 4b, both are curved plates with corresponding shapes. The first crank part 4a/second crank part 4b consists of a front plate 4a1/4b1 and a rear plate 4a2/4b2 formed by extension and bending of the front plate 4a1/4b1. The front plate 4a1 is disposed with a third axial hole 41a, a third slide slot 42a, and a first sub hole 45a while the rear plate 4a2 is arranged with a first main hole 43a, a first insertion hole 44a and a third sub hole 46a. Similarly, the front plate 4b1 is disposed with a fourth axial hole 41b, a fourth slide slot 42b, and a second sub hole 45b while the rear plate 4b2 is arranged with a second main hole 43b, a second insertion hole 44b and a fourth sub hole 46b.

The cutting tool 3 includes a blade part 31, a lower part 31a, a teeth part 32 and a projection part 35. The projection part 35 is formed by extension of the blade part 31. The curved teeth part 32 is located on the opposite site of the blade part 31 and formed by extension of the blade part 31. The teeth part 32 is extended to the rear end of the lower part 31a. The teeth part 32 includes at least eight curved teeth while the lower part 31a is set with a fifth axial hole 33 and a locking hole 34.

The first locking member 7 is disposed with a hook part 71, a first projecting rod 72a, a second projecting rod 72b, a first pivot hole 73 and a hole 74. The second locking member 6 is arranged with a hook part 61, a first projecting rod 62a, a second projecting rod 62b, and a second pivot hole 63. The first projecting rod 72a and the second projecting rod 72b are arranged symmetrically and coaxially. The first projecting rod 72a is extended and passed through the first locking member 7 to form the second projecting rod 72b, so is the first projecting rod 62a formed by the second projecting rod 62b of the second locking member 6. The first locking member 7 is pivotally connected to and positioned at the first shaft hole 17a of the first fixing part 1a and the second shaft hole 17b of the second fixing part 1b by a screw a7. The second pivot hole 63 of the second locking member 6 is aligned with the first main hole 43a and the second main hole 43b of the crank member 4 to be fastened with and positioned at the crank member 4 by a screw b3. The first projecting rod 62a and the second projecting rod 62b of the second locking member 6 are passed through the third slide slot 42a and the fourth slide slot 42b respectively.

The second spring 10 is a return spring with two coil parts 101, 102 and an against part 103. The coil part 102 is formed by extension of the coil part 101 and the coil part 102 is coiled and extended to form the against part 103 inclined at an angle. The coil part 101 is aligned with the third sub hole 46a of the first crank part 4a and the fourth sub hole 46b of the second crank part 4b while the coil part 102 is aligned with the first sub hole 45a of the first crank part 4a and the second sub hole 45b of the second crank part 4b. Then the coil parts 101, 102 are respectively fastened and positioned by screws b6, b5. The against part 103 is leaning against a back part 6b of the second locking member 6. Thereby the second locking member 6 can be turned back elastically due to the second spring 10.

The fifth axial hole 33 of the cutting tool 3 is aligned with the third, the fourth axial holes 41a, 41b of the crank member 4 and the first, the second axial holes 14a, 14b of the fixing member 1 to be pivotally connected and fastened by a screw a4.

The third spring 8 includes a coil part 81 extended to form a spring part while the spring part is further extended to form a hooked tail end 82. The tail end 82 is hooked into the locking hole 34 of the cutting tool 3 while the coil part 81 is pivotally connected to the mounting holes 123a, 123b of the fixing member 1. By the lower part 31a of the cutting tool 3 being pulled by the third spring 8, the cutting tool 3 is pulled and opened at a certain angle when the hook parts 61, 71 of the first and the second locking members 6, 7 are separated from the teeth 32 of the cutting tool 3. As to the blunt member 2, it is used to limit the cutting tool 3 and prevent the cutting tool 3 from being opened over a certain range. In other words, the cutting tool 3 is pulled by the third spring 8 to be opened at a certain angle. The cutting tool 3 is against and limited by the blunt member 2 so that the cutting tool 3 can be opened within a certain range.

The moveable handle 5 includes a handle part 51, an assembly part 51a, a fifth slide slot 52 and a sixth axial hole 53. The assembly part 51a formed by extension of the handle part 51 and is arranged with the fifth slide slot 52 and the sixth axial hole 53. The fifth slide slot 52 is a long groove while the sixth axial hole 53 is aligned with the first and the second assembly holes 13a, 13b of the fixing member 1 and then pivotally connected to and fastened with one another by a bolt a3. The fifth slide slot 52 is pivotally connected to the first and the second insertion holes 44a, 44b of the crank member 4 by a bolt b4. When the moveable handle 5 is driven to move, the pivotally connected first and the second insertion holes 44a, 44b of the crank member 4 are moveable within the fifth slide slot 52.

The first spring 9 includes a coil part 9. The coil part 91 is extended to form a spring part while a rear end 92 is formed by extension and bending of the spring part. The rear end 92 is hooked into the hole 74 of the first locking member 7 while the coil part 91 is aligned with the mounting holes 16a, 16b of the fixing member 1 to be fastened on the fixing member 1 by a screw a6. Thus the first locking member 7 can be turned back elastically due to the hole 74 of the first locking member 7 being pulled by the first spring 9.

Due to the fifth slide slot 52 of the moveable handle 5 aligned with and pivotally connected to the first and the second insertion holes 44a, 44b of the crank member 4 by the bolt b4, the pivotally connected rear plates 4a2, 4b2 of the crank member 4 are moveable along the fifth slide slot 52.

The first and the second crank parts 4a, 4b of the crank member 4 are clipped between the first fixing part 1a and the second fixing part 1b of the fixing member 1. The cutting tool 3, the moveable handle 5, the first locking member 7, and the second locking member 6 are clipped between the first and the second crank parts 4a, 4b of the crank member 4. The assembled pruning shears is shown in FIG. 3.

Figure 4:
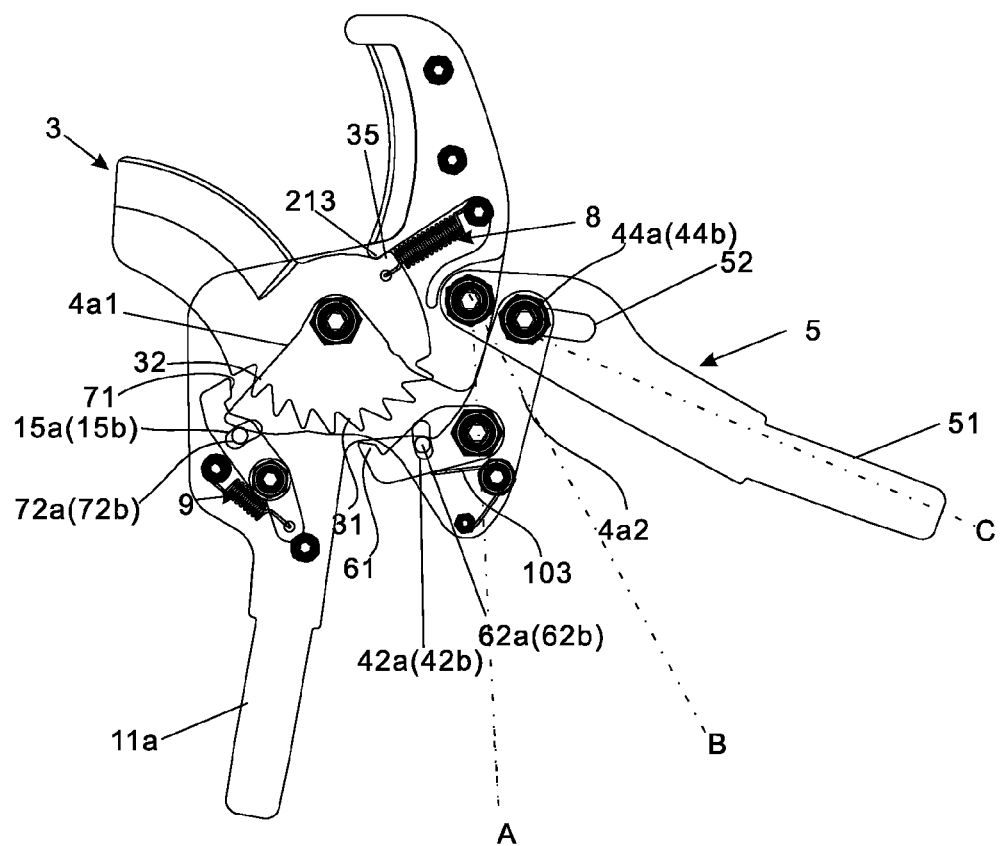
FIG. 4 is a schematic drawing showing an embodiment at a completely opened state according to the present invention.

Refer from FIG. 3 to FIG. 11, the pruning shears with multi-stage action of the present invention can be operated at different stages. In FIG. 3, the blade part 31 of the cutting tool 3 and the blunt member 2 are at a completely closed state. At the moment, the hook part 71 of the first locking member 7 is locked at the fifth teeth while the hook part 61 of the second locking member 6 is hooked with the eighth teeth. In order to open the pruning shears, first the handle part 51 of the moveable handle 5 is pulled from Point A to Point C. Now the front plate 4a1 of the crank member 4 is leaning against the first and the second projecting rods 72a, 72b so that the second projecting rods 72a, 72b are pushed from a first end 151a/151b to a second end 152a/152b of the first slide slot 15a/the second slide slot 15b respectively. Thereby the hook part 71 of the first locking members 7 is released from the teeth part 32 of the cutting tool 3. At the same time, the second locking member 6 driven by the moveable handle 5 acts to pull and move the crank member 4. The pivotally connected rear plates 4a2 are moved toward the other end of the fifth slide slot 52 while the first projecting rod 62a and the second projecting rod 62b of the second locking member 6 are pushed and against by the step-like portion 132 so that the hook part 61 of the second locking member 6 is released from the teeth part 32 of the cutting tool 3. Moreover, the cutting tool 3 is pulled by the third spring 8 while being opened. In order to prevent the cutting tool 3 from being opened too much, the projection part 35 is stopped by the lip part 213 of the blunt member 2 while the cutting tool 3 is opened. The maximum angle the cutting tool 3 can be opened is shown in FIG. 4.

Figure 5:
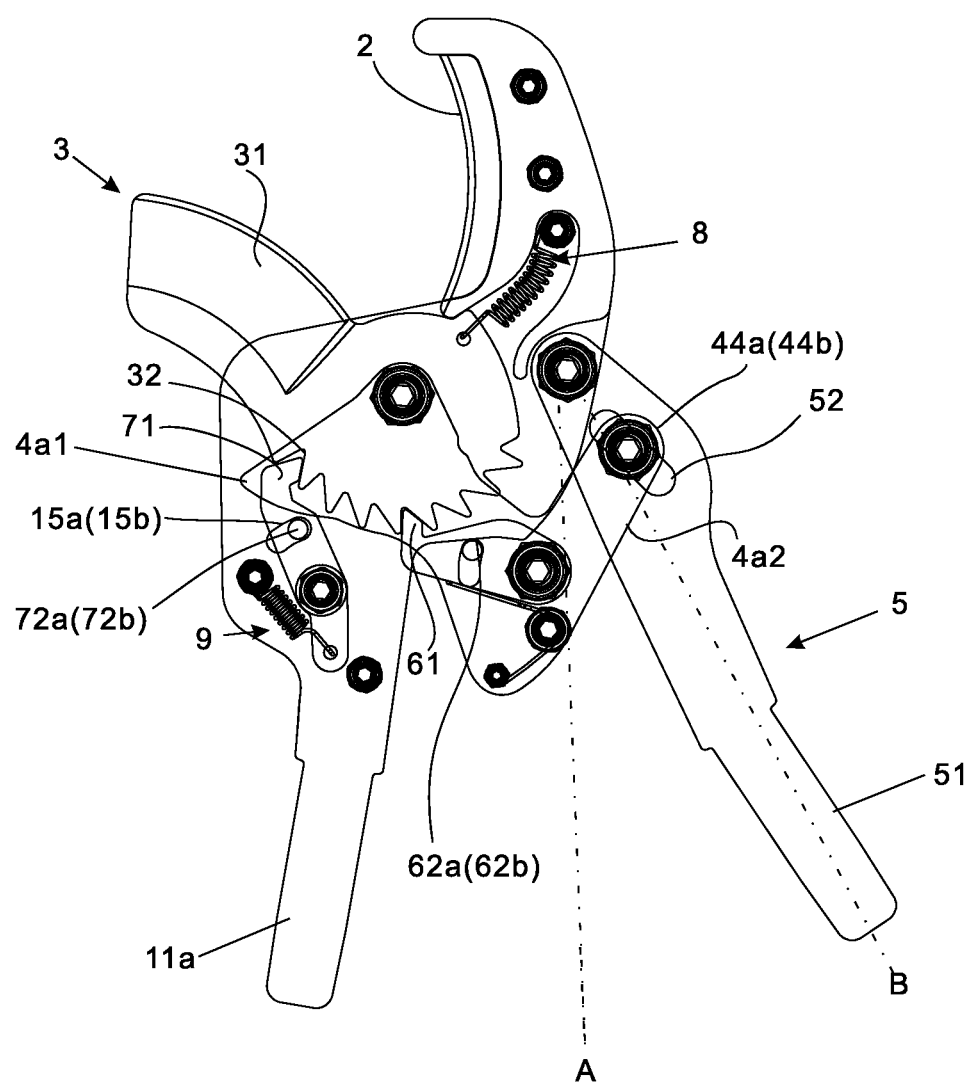
FIG. 5 is a schematic drawing showing an embodiment that performs a first stage cutting according to the present invention.
Figure 6:
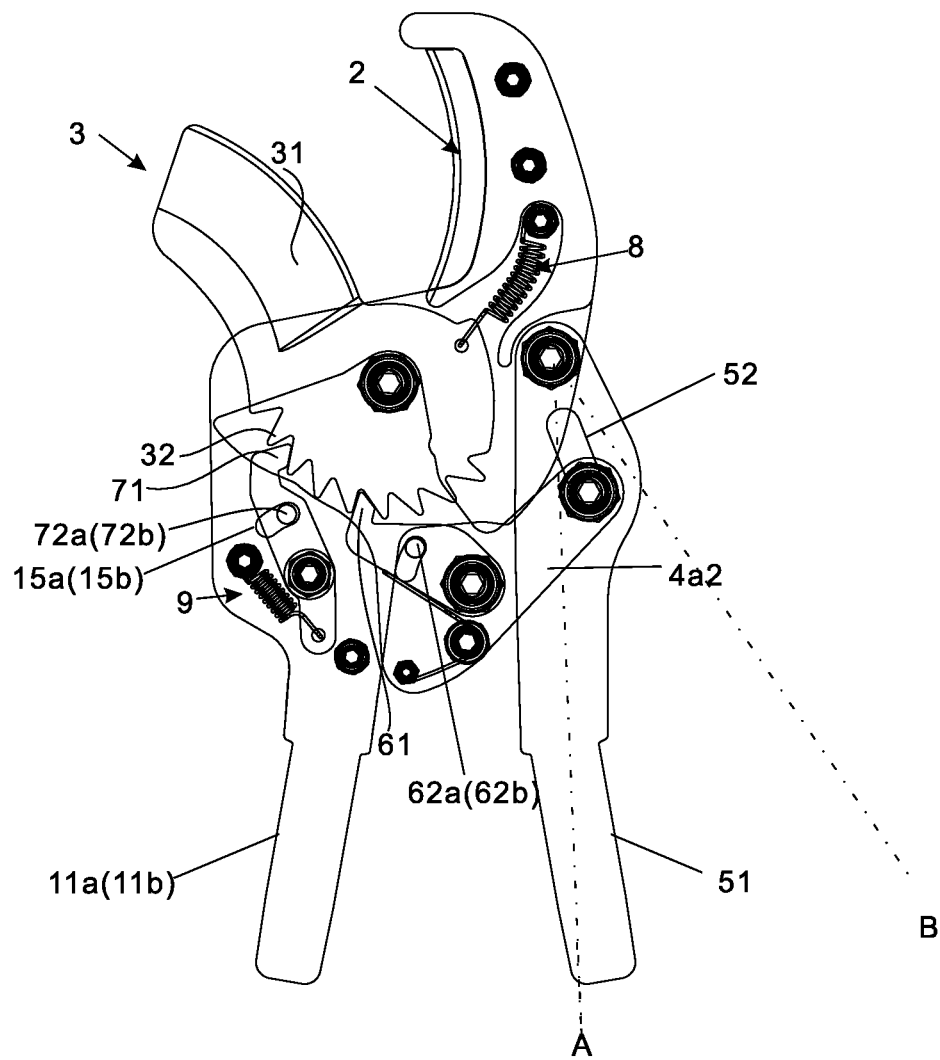
FIG. 6 is another schematic drawing showing an embodiment that performs a first stage action according to the present invention.

Refer to FIG. 5 and FIG. 6, take a first stage action. The handle part 51 of the moveable handle 5 is turned back to Point B. Now the hook part 71 of the first locking members 7 is engaged with the first teeth and the hook part 61 of the second locking member 6 is engaged with the fifth teeth while the cutting tool 3 is maintained at the original position. Then the handle part 51b is pulled back to Point A and the crank member 4 is driven to move the second locking member 6 while the teeth part 32 of the cutting tool 3 starts cutting. It should be noted that the front plate 4a1 of the crank member 4 will not be in contact with the first locking member 7 no matter the handle part 51 is moved from the Point B to the Point A or from the Point A to the Point B. The front plate 4a1 of the crank member 4 is in contact with the first locking member 7 only during the movement between the Point B and the Point C. Synchronously with the movement of the handle 51, the second locking member 6 is against the fifth tooth of the teeth part 32 while the hook part 71 of the first locking member 7 is moved toward the second tooth along the teeth part 32. Due to recovery elasticity of the first spring 9, the first locking member 7 is leaning against the teeth part 32 of the cutting tool 3, moving along the teeth part 32 and going to be engaged with the second tooth. At the moment, the hook part 61 of the second locking member 6 is against the fifth tooth so that the teeth part 32 of the cutting tool 3 is pushed by the second locking member 6 and rotated a certain angle. Thus the blade part 31 of the cutting tool 3 is moved to a first-stage position of the blunt member 2 while the hook part 71 of the first locking member 7 is engaged with the second tooth of the teeth part 32 smoothly due to the first spring 9 and the hook part 61 of the second locking member 6 is also engaged with the fifth tooth. Thereby the first-stage cutting is finished.

Figure 7:
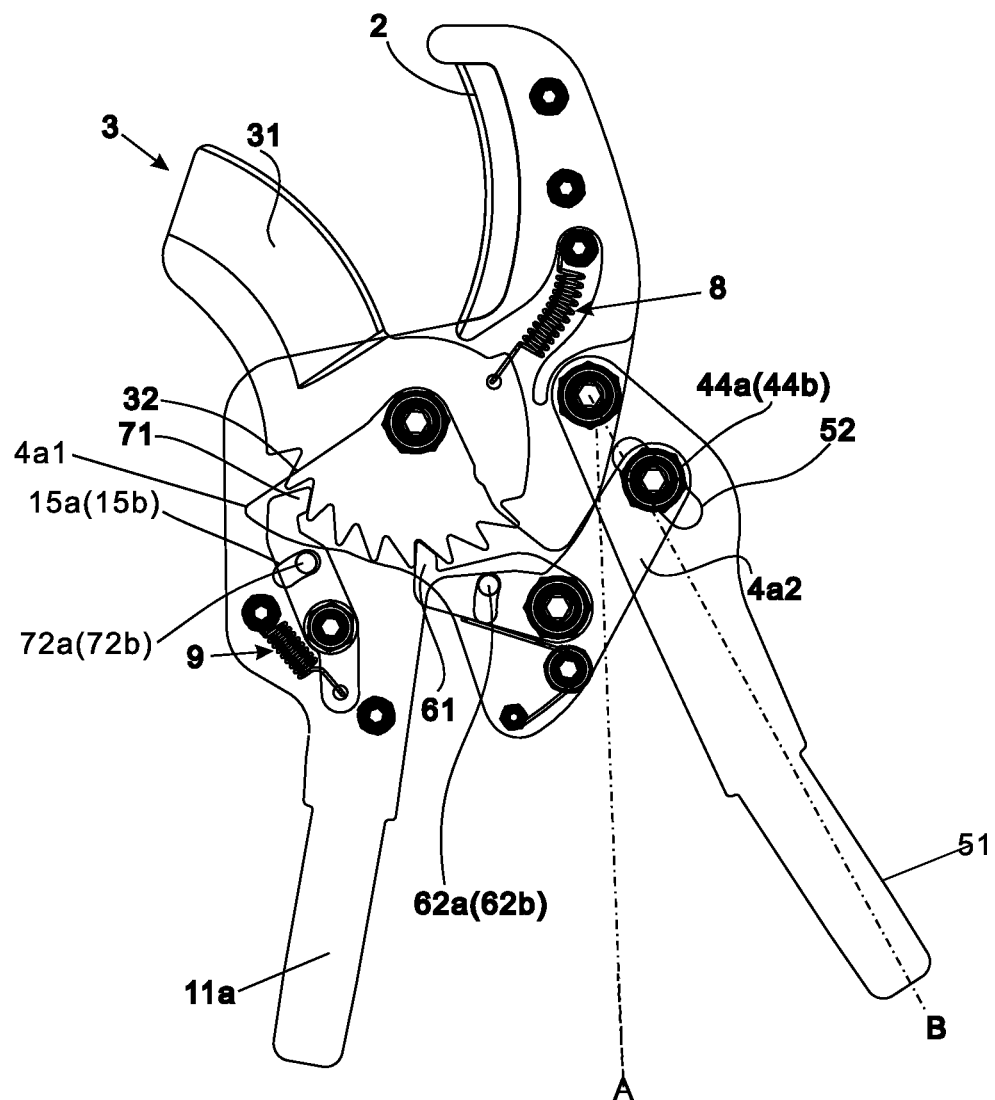
FIG. 7 is a schematic drawing showing an embodiment that performs a second stage cutting according to the present invention.
Figure 8:
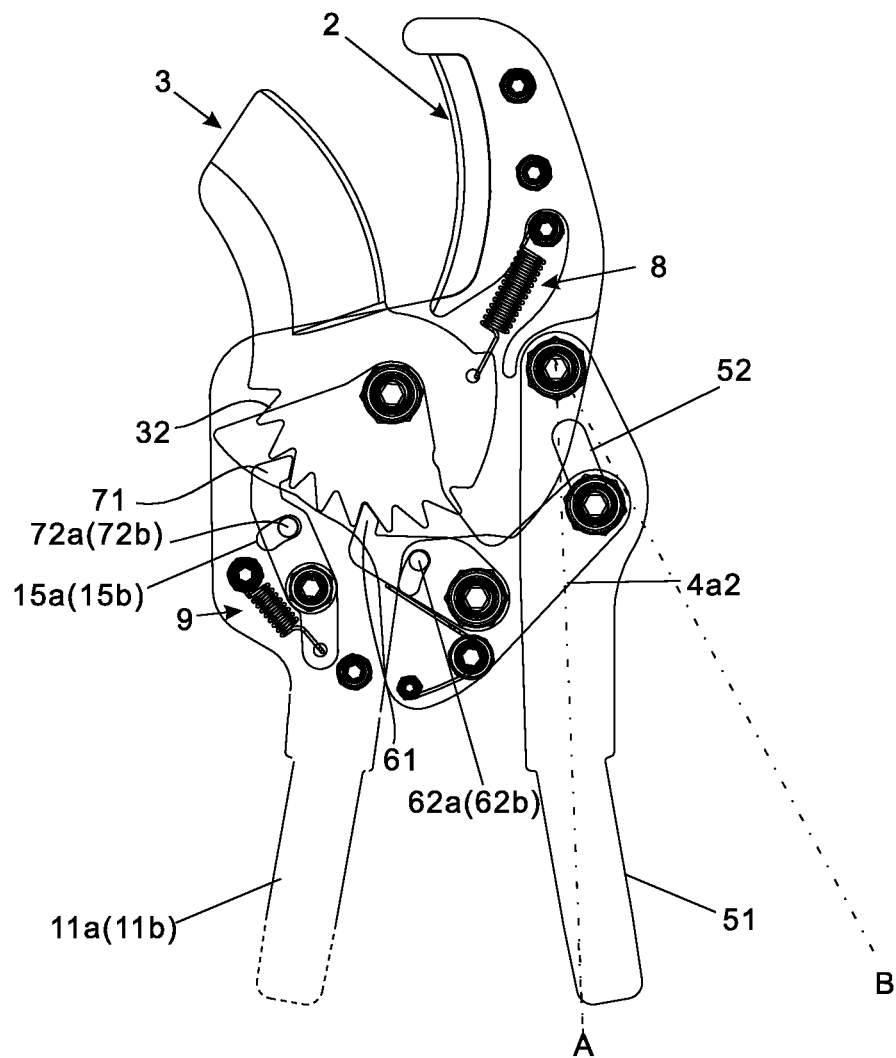
FIG. 8 is another schematic drawing showing an embodiment that performs a second stage action according to the present invention.

Refer to FIG. 7 and FIG. 8, take a second stage action. The handle part 51 of the moveable handle 5 is pulled back to the Point B. At the same time, the crank member 4 pulled by the handle part 51 drives the hook part 61 of the second locking member 6 to be released from the fifth tooth and moved to the six tooth. Then the hook part 61 is engaged into the sixth tooth due to the against part 103 of the second spring 10 against the back part 6b of the second locking member 6. Then the handle part 51 is pulled from the Point B to the Point A. At the moment, the second locking member 6 is against the sixth tooth while the hook part 71 of the first locking member 7 is moved toward the next tooth along the teeth part 32. When the teeth part 32 of the cutting tool 3 is pushed by the second locking member 6 and rotated a certain angle, the first locking member 7 is engaged with the third tooth of the teeth part 32 smoothly due to the first spring 9. Now the hook part 61 of the second locking member 6 is against the sixth tooth so that the blade part 31 of the cutting tool 3 is moved to next stage position of the blunt member 2. At the moment, the hook part 71 of the first locking member 7 is engaged with the third tooth and the hook part 61 of the second locking member 6 is engaged with the sixth tooth. Thereby the cutting tool 3 is positioned after performing the second-stage operation at the second-stage closed position.

Figure 9:
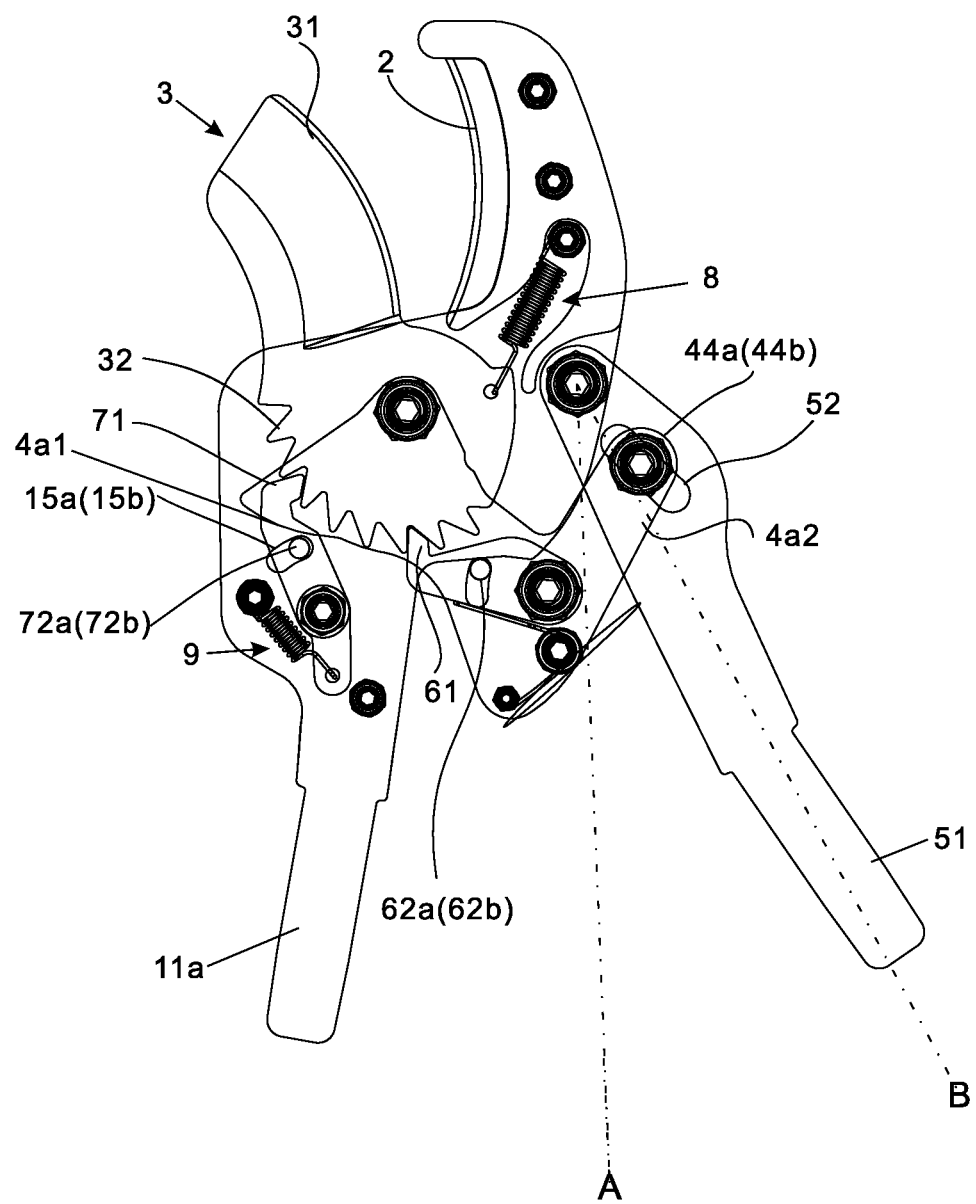
FIG. 9 is a schematic drawing showing an embodiment that performs a third stage cutting according to the present invention.
Figure 10:
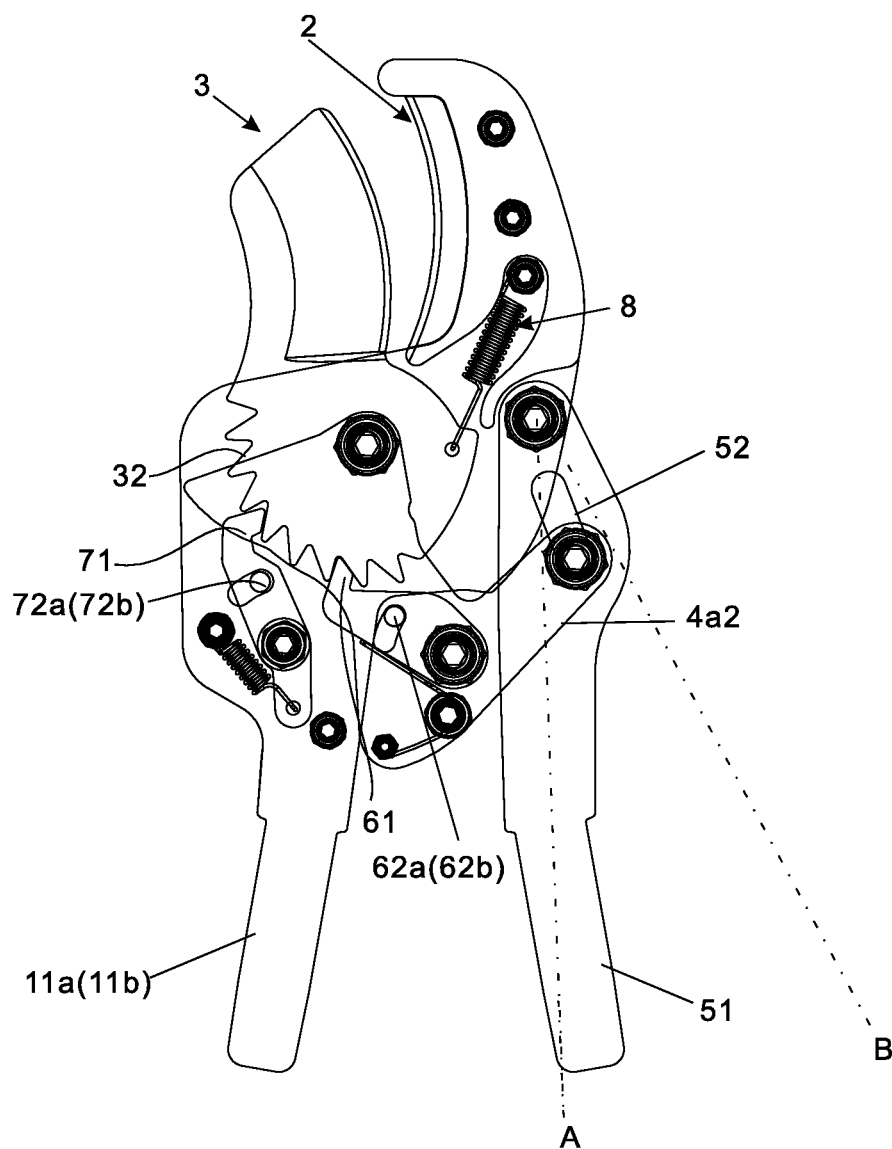
FIG. 10 is another schematic drawing showing an embodiment that performs a third stage action according to the present invention.

Refer to FIG. 9 and FIG. 10, take a third stage operation. The handle part 51 of the moveable handle 5 is pulled back to the Point B. At the same time, the crank member 4 pulled by the handle part 51 drives the hook part 61 of the second locking member 6 to be moved from the six tooth to the seventh tooth. Then the hook part 61 is engaged into the seventh tooth due to the against part 103 of the second spring 10 against the back part 6b of the second locking member 6. Next the handle part 51 is pulled back to the Point A. During the movement, the hook part 61 of the second locking member 6 is against the seventh tooth so that the blade part 31 of the cutting tool 3 is moved to the third stage position of the blunt member 2. At the same time, the hook part 71 of the first locking member 7 is moved toward the fourth tooth. While the handle 51 arriving the Point A, the hook part 71 of the first locking member 7 is engaged into the fourth tooth of the teeth part 32 because the first locking member 7 is pulled by the first spring 9. The hook part 61 of the second locking member 6 is also leaning against the seventh tooth. Thereby the cutting tool 3 is positioned after performing the third-stage operation at the third-stage closed position.

Figure 11:
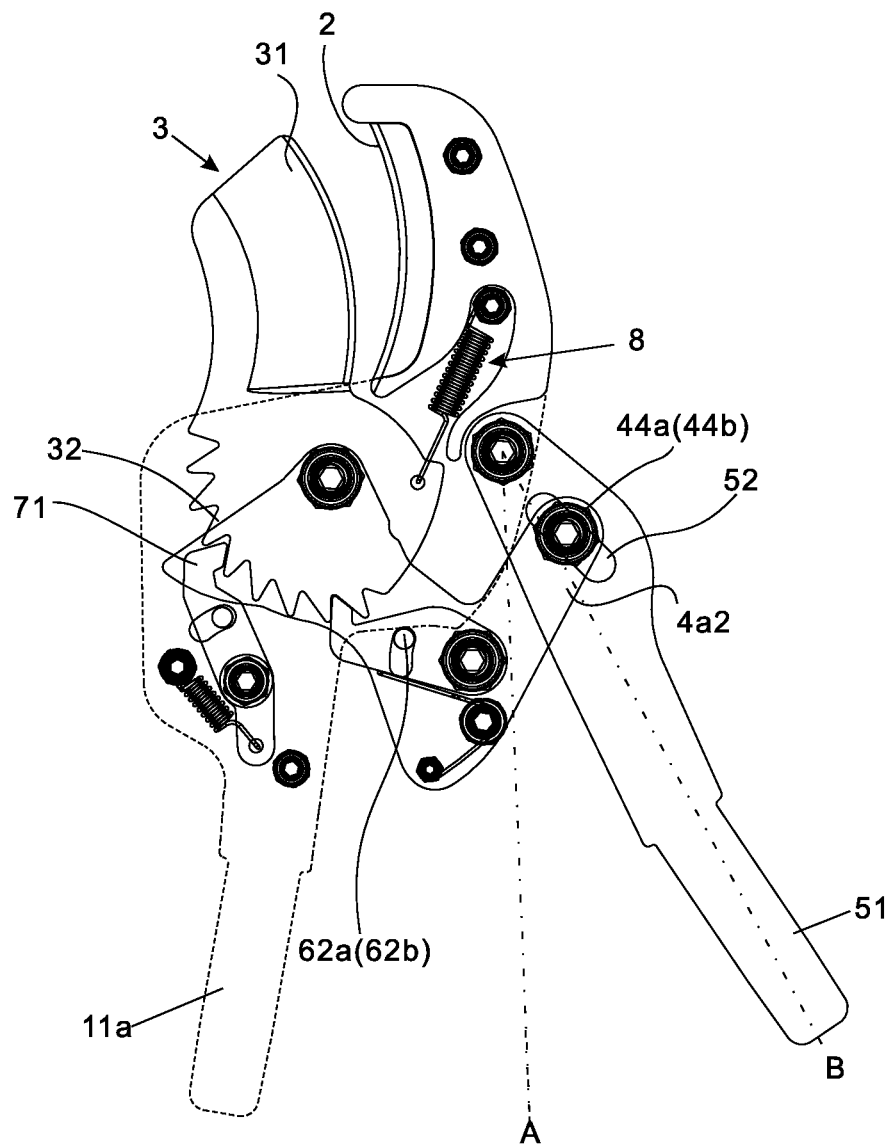
FIG. 11 is a schematic drawing showing an embodiment that performs a fourth stage cutting according to the present invention.

Refer to FIG. 3 and FIG. 11, take a fourth stage operation. The handle part 51 of the moveable handle 5 is pulled to the Point B. At the same time, the crank member 4 pulled by the handle part 51 drives the hook part 61 of the second locking member 6 to be released from the seventh tooth and moved to the eighth tooth. Then the hook part 61 is engaged into the eighth tooth due to the against part 103 of the second spring 10 against the back part 6b of the second locking member 6. Next the handle part 51 is pulled back from the Point B to the Point A. During the movement, the hook part 61 of the second locking member 6 is against the eighth tooth so that the blade part 31 of the cutting tool 3 is moved again to the fourth stage position of the blunt member 2. At the same time, the hook part 71 of the first locking member 7 is moved toward the fifth tooth. The hook part 71 of the first locking member 7 is not engaged into the fifth tooth until the handle 51 is arrived at the Point A. The hook part 61 of the second locking member 6 is also against the eighth tooth. Thereby the blade part 31 of the cutting tool 3 and the blunt member 2 are closed completely. The last cutting is completed.

While performing multi-stage cutting, the first locking member 7 and the second locking member 6 are engaged with two teeth of the teeth part 32 of the cutting tool 3 respectively at the same time. Thereby the closing action between the blade part 31 of the cutting tool 3 and the blunt member 2 is divided into four stages by the first locking member 7 and the second locking member 6 being engaged with different teeth respectively. The closed distance of each stage is restricted. Being driven by opening and closing of the handle part 51 of the moveable handle 5, the first locking member 7 and the second locking member 6 are released from the original tooth engaged and moved to the next tooth respectively. The movement includes four stages and the distance is limited by the teeth. The distance between the blade part 31 of the cutting tool 3 and the blunt member 2 is gradually shortened by the four stages. At the fourth stage, the pruning shears are completely closed.

In summary, the present invention features on that the pruning shears act at different stages. The cutting tool 3 performs multi-stage cutting by the second locking member 6 pushing against the teeth part 32 of the cutting tool 3. The second locking member 6 is not only used to push against the teeth part 32 of the cutting tool 3 but also allow the teeth part 32 of the cutting tool 3 being engaged therewith. When the handle part 51 of the moveable handle 5 is pulled from the Point A to the Point B, the force users applied can be saved due to the crank member 4 connecting the fixing member 1 and the moveable handle 5. The crank member 4 is used like a crank in the linkage. During the multi-stage movement of the moveable handle 5, the force stroke is reduced due to the crank member 4 and the force required is decreased.

The first locking member 7 is used for engagement of the teeth part 32. Thus each action of the handle part 51 is stopped by a bit force. When the user drives the handle part 51 to move during multi-stage movement, the teeth part 32 is temporarily stopped to prevent the cutting tool 3 from being opened over a certain range. Thus the cutting tool 3 and the blunt member 2 will not be turned back to the completely-opened state even the user pushes the handle part 51 too much.

Moreover, during each-stage operation of the handle part 51, the first locking member 7 is against the tooth contacted at the moment so as to prevent the cutting tool 3 from being turned back to the completely opened state due to the third spring 8.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A pair of pruning shears with multi-stage actions for cutting branches having diameter larger than 30 mm comprising:

a fixing member having a first fixing part and a second fixing part assembled with each other correspondingly; each of the first fixing part and the second fixing part including an upper portion and a handle portion formed by extension of the upper portion; the upper portion being disposed with a first axial hole, a first slide slot, a first assembly hole, a first shaft hole, and at least one mounting hole while the other upper portion being arranged with a second axial hole, a second slide slot, a second assembly hole, a second shaft hole, and at least one mounting hole;

a moveable handle disposed with a handle part, and an assembly part formed by extension of the handle part while the assembly part being arranged with a fifth slide slot and a sixth axial hole;

a crank member having a first crank part and a second crank part that are curved plates with corresponding shapes; each of the first crank part and the second crank part including a front plate and a rear plate formed by extension and bending of the front plate; wherein one of the front plates is disposed with a third axial hole, a third slide slot, and a first sub hole while the other front plate having a fourth axial hole, a fourth slide slot, and a second sub hole; wherein one of the rear plates is arranged with a first main hole, a first insertion hole and a third sub hole while the other rear plate is arranged with a second main hole, a second insertion hole and a fourth sub hole;

a cutting tool that includes a blade part, a lower part, and a teeth part; a lower end at a rear side of the blade part being extended to form a curved teeth part while the teeth part being extended to a rear end of the lower part; wherein the teeth part includes a plurality of teeth arranged in a curved manner and the lower part is set with a fifth axial hole and a locking hole;

a blunt member including a back part, a leaning part, and fastening holes; the back part being arranged with the fastening holes while the leaning part being disposed opposite to the back part;

a first locking member disposed with a hook part, a first projecting rod, a second projecting rod formed by extension of the first projecting rod passed through the first locking member, a first pivot hole and a hole; wherein the first projecting rod and the second projecting rod are arranged symmetrically and coaxially; wherein the first pivot hole and the hole are mounted on one end of the first locking member;

a second locking member disposed with a hook part, a first projecting rod, a second projecting rod formed by extension of the first projecting rod of the second locking member passed through the second locking member, and a second pivot hole; wherein the first projecting rod of the second locking member and the second projecting rod of the second locking member are arranged symmetrically and coaxially; wherein the hook part of the second locking member is disposed on one end of the second locking member while the second pivot hole is mounted on the other end of the second locking member, opposite to the end with the hook part of the second locking member;

a first spring having a coil part extended to form a spring part and a hooked rear end formed by extension and bending of the spring part;

a second spring that is a return spring having two coil parts and an against part; wherein one of the coil parts is extended to form the other coil part while the other coil part is coiled and extended to form the against part inclined at an angle; and a third spring that includes a coil part extended to form a spring part and a hooked tail end formed by extension and bending of the spring part of the third spring;

wherein the mounting hole of the first fixing part is aligned with the mounting hole of the second fixing part and then fastened by a screw to form the fixing member; the blunt member is pivotally disposed and positioned on the upper portions of the first fixing part and the second fixing part; wherein the first and the second insertion holes of the crank member are aligned with and pivotally connected to the fifth slide slot of the moveable handle by a bolt; thereby the pivotally connected rear plates of the crank member are moveable along the fifth slide slot; wherein the first pivot hole of the first locking member is aligned the first shaft hole and the second shaft hole and then pivotally connected by a screw; wherein the second pivot hole of the second locking member is aligned with the first main hole and the second main hole of the crank member to be fastened on and positioned at the crank member by a screw; wherein the first projecting rod and the second projecting rod of the second locking member are passed through the third slide slot and the fourth slide slot respectively; wherein the coil parts of the second spring are aligned with the first sub hole of the first crank part, the second sub hole of the second crank part, and the third sub hole of the first crank part, the fourth sub hole of the second crank part to be fastened and positioned by a screw respectively; wherein the against part is leaning against a back part of the second locking member so that the second locking member is able to be turned back elastically due to the second spring; wherein the fifth axial hole of the cutting tool is aligned with the third, the fourth axial holes of the crank member and the first, the second axial holes of the fixing member to be pivotally connected and fastened with one another by a screw; wherein the tail end of the third spring is hooked into the locking hole of the cutting tool while the coil part of the third spring is aligned with the mounting holes of the fixing member and then pivotally connected by a screw; wherein the sixth axial hole of the moveable handle, and the first and the second assembly holes of the fixing member are pivotally connected and fastened by a bolt; wherein the rear end of the first spring is hooked into the hole of the first locking member while the coil part of the first spring is aligned with the mounting holes of the fixing member to be fastened and positioned by a screw.

2. A pair of pruning shears with multi-stage actions for cutting branches having diameter larger than 30 mm comprising:

a fixing member, a blunt member, a cutting tool, a crank member, a moveable handle, a first locking member, a second locking member, a first spring, a second spring and a third spring; wherein the fixing member includes a first fixing part and a second fixing part assembled with each other correspondingly; the first fixing part is disposed with a first axial hole, a first slide slot, a first shaft hole, and at least one mounting hole while the second fixing part is arranged with a second axial hole, a second slide slot, a second shaft hole, and at least one mounting hole; the holes of the first fixing part and the second fixing part are corresponding to each other and having the same shape;

wherein the blunt member is clipped and fixed between the first fixing part and the second fixing part;

wherein the crank member having a first crank part and a second crank part, both are curved plates with corresponding shapes; each of the first crank part and the second crank part includes a front plate and a rear plate formed by extension and bending of the front plate; one of the front plates is disposed with a third axial hole, a third slide slot, and a first sub hole while the other front plate is having a fourth axial hole, a fourth slide slot, and a second sub hole; one of the rear plates is arranged with a first main hole, a first insertion hole and a third sub hole while the other rear plate is arranged with a second main hole, a second insertion hole and a fourth sub hole;

wherein the cutting tool includes a blade part, a lower part, a curved teeth part and a locking hole; a lower end at a rear side of the blade part is extended to form the curved teeth part and the teeth part is extended to the lower part while the lower part is arranged with a fifth axial hole and the locking hole;

wherein each of the first locking member and the second locking member includes a hook part, a first projecting rod, and a second projecting rod while the first projecting rod and the second projecting rod are arranged symmetrically; the first locking member is arranged with a first pivot hole and a hole while the second locking member is with a second pivot hole; the first locking member is pivotally connected to the fixing member while the second locking member is pivotally connected to the crank member;

wherein the fifth axial hole of the cutting tool is aligned with the third, the fourth axial holes of the crank member and the first, the second axial holes of the fixing member to be connected to one another pivotally and coaxially;

wherein the moveable handle is disposed with a handle part and the other end of the handle part is arranged with a fifth slide slot and a sixth axial hole; wherein the fifth slide slot is aligned with the first and the second main holes of the crank member to be pivoted by a bolt; the sixth axial hole of the moveable handle, and first and second assembly holes of the fixing member are connected pivotally and coaxially;

wherein the first spring having a coil part extended to form a spring part and a rear end formed by extension and bending of the spring part; the rear end is hooked into the hole of the first locking member and the coil part is pivotally connected to the fixing member so that the first locking member is able to be turned back elastically;

wherein the second spring is a return spring having two coil parts and an against part; one of the coil parts is coiled and extended to form the against part inclined at an angle; the coil parts are pivotally mounted in the crank member and the against part is leaning against the second locking member so that the second locking member is able to be turned back elastically;

wherein the third spring includes a coil part extended to form a spring part and a hooked tail end formed by extension and bending of the coil part of the third spring; the tail end is hooked into the locking hole of the cutting tool while the coil part of the third spring is pivotally connected to the fixing member; thereby the cutting tool is maintained at a state of being pulled when the cutting tool is driven to be closed gradually;

wherein the first and the second insertion holes of the crank member are pivotally connected to the fifth slide slot;

wherein the first locking member and the second locking member are engaged with two teeth of the curved teeth part respectively at the same time during opening and closing of the pruning shears for cutting; thereby closing action of the cutting tool is divided into four stages by the first locking member and the second locking member; the first locking member and the second locking member are engaged with different teeth respectively at each of the stage so that a moved distance of the cutting tool is restricted; the first locking member and the second locking member are released from the original teeth engaged and moved to the next tooth respectively while being driven by opening and closing of the handle part at each of the four stages; a distance between the blade part and the blunt member is gradually shortened at each of the four stages while the blade part and the blunt member are not completely closed to each other until the fourth stage.

3. A pair of pruning shears with multi-stage actions for cutting branches having diameter larger than 30 mm comprising:

a fixing member having a first fixing part and a second fixing part assembled with each other correspondingly; each of the first fixing part and the second fixing part including an upper portion and a handle portion formed by extension of the upper portion; the upper portion being disposed with a first axial hole, a first slide slot, a first assembly hole, a first shaft hole, and at least one mounting hole while the other upper portion being arranged with a second axial hole, a second slide slot, a second assembly hole, a second shaft hole, and at least one mounting hole;

a moveable handle disposed with a handle part, and an assembly part formed by extension of the handle part while the assembly part being arranged with a fifth slide slot and a sixth axial hole;

a crank member having a first crank part and a second crank part that are curved plates with corresponding shapes; each of the first crank part and the second crank part including a front plate and a rear plate formed by extension and bending of the front plate; wherein one of the front plates is disposed with a third axial hole, a third slide slot, and a first sub hole while the other front plate having a fourth axial hole, a fourth slide slot, and a second sub hole; wherein one of the rear plates is arranged with a first main hole, a first insertion hole and a third sub hole while the other rear plate is arranged with a second main hole, a second insertion hole and a fourth sub hole;

a cutting tool that includes a blade part, a lower part, and teeth part; a lower end at a rear side of the blade part being extended to form a curved teeth part while the teeth part being extended to a rear end of the lower part; wherein the teeth part includes a plurality of teeth arranged in a curved manner and the lower part is set with a fifth axial hole and a locking hole;

a blunt member including a back part, a leaning part, and fastening holes; the back part being arranged with the fastening holes while the leaning part being disposed opposite to the back part;

a first locking member disposed with a hook part, a first projecting rod, a second projecting rod formed by extension of the first projecting rod passed through the first locking member, a first pivot hole and a hole; wherein the first projecting rod and the second projecting rod are arranged symmetrically and coaxially; wherein the first pivot hole and the hole are mounted on one end of the first locking member;

a second locking member disposed with a hook part, a first projecting rod, a second projecting rod formed by extension of the first projecting rod of the second locking member passed through the second locking member, and a second pivot hole; wherein the first projecting rod of the second locking member and the second projecting rod of the second locking member are arranged symmetrically and coaxially; wherein the hook part of the second locking member is disposed on one end of the second locking member while the second pivot hole is mounted on the other end of the second locking member, opposite to the end with the hook part of the second locking member;

a first spring having a coil part extended to form a spring part and a hooked rear end formed by extension and bending of the spring part;

a second spring that is a return spring having two coil parts and an against part; wherein one of the coil part is extended to form the other coil part while the other coil part is coiled and extended to form the against part inclined at an angle;

a third spring that includes a coil part extended to form a spring part and a hooked tail end formed by extension and bending of the spring part of the third spring, wherein the mounting hole of the first fixing part and the mounting hole of the second fixing part are fastened to form the fixing member while the blunt member is pivotally disposed and positioned on the upper portions of the first fixing part and the second fixing part;

wherein the first and the second insertion holes of the crank member are aligned with and pivotally connected to the fifth slide slot of the moveable handle so that the pivotally connected rear plates of the crank member are moveable along the fifth slide slot; wherein the first pivot hole of the first locking member is aligned the first shaft hole and the second shaft hole, then pivotally connected and positioned; wherein the second pivot hole of the second locking member is aligned with the first main hole and the second main hole of the crank member to be fastened and positioned; wherein the first projecting rod and the second projecting rod of the second locking member are passed through the third slide slot and the fourth slide slot respectively; wherein the coil parts of the second spring are aligned with the first sub hole of the first crank part, the second sub hole of the second crank part, and the third sub hole of the first crank part, the fourth sub hole of the second crank part respectively to be fastened and positioned; wherein the against part is leaning against a back part of the second locking member so that the second locking member is able to be turned back elastically due to the second spring; wherein the fifth axial hole of the cutting tool is aligned with the third, the fourth axial holes of the crank member and the first, the second axial holes of the fixing member to be pivotally connected and fastened with one another; wherein the tail end of the third spring is hooked into the locking hole of the cutting tool while the coil part of the third spring is aligned with the mounting holes of the fixing member and then pivotally connected and positioned; wherein the sixth axial hole of the moveable handle, and the first and the second assembly holes of the fixing member are aligned and pivotally connected; wherein the rear end of the first spring is hooked into the hole of the first locking member while the coil part of the first spring is aligned with the mounting holes of the fixing member to be fastened and positioned.

\* \* \* \* \*